C. MULLET.
ARRANGEMENT FOR SECURING CONNECTING RODS TO THE SINGLE CRANKS OF FIXED OR ROTARY RADIAL CYLINDERED ENGINES.
APPLICATION FILED SEPT. 28, 1917.

1,287,398.

Patented Dec. 10, 1918.
3 SHEETS—SHEET 1.

Inventor
Claude Mullet
By Howson and Howson
Attorneys

C. MULLET.
ARRANGEMENT FOR SECURING CONNECTING RODS TO THE SINGLE CRANKS OF FIXED OR ROTARY RADIAL CYLINDERED ENGINES.
APPLICATION FILED SEPT. 28, 1917.

1,287,398.

Patented Dec. 10, 1918.
3 SHEETS—SHEET 2.

Inventor
Claude Mullet
By Howson and Howson
Attorneys

C. MULLET.
ARRANGEMENT FOR SECURING CONNECTING RODS TO THE SINGLE CRANKS OF FIXED OR ROTARY RADIAL CYLINDERED ENGINES.
APPLICATION FILED SEPT. 28, 1917.
1,287,398.
Patented Dec. 10, 1918.
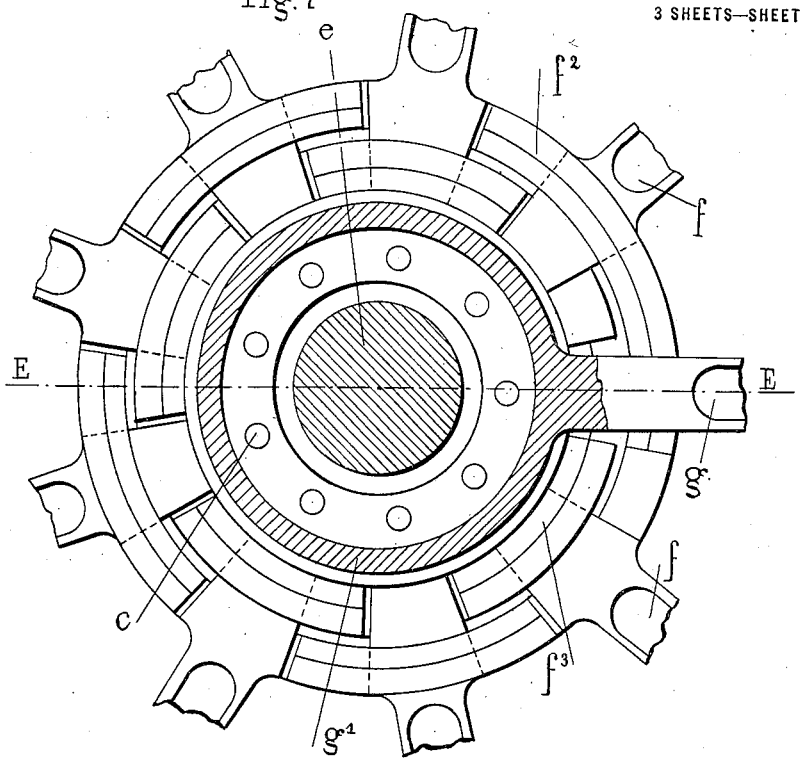
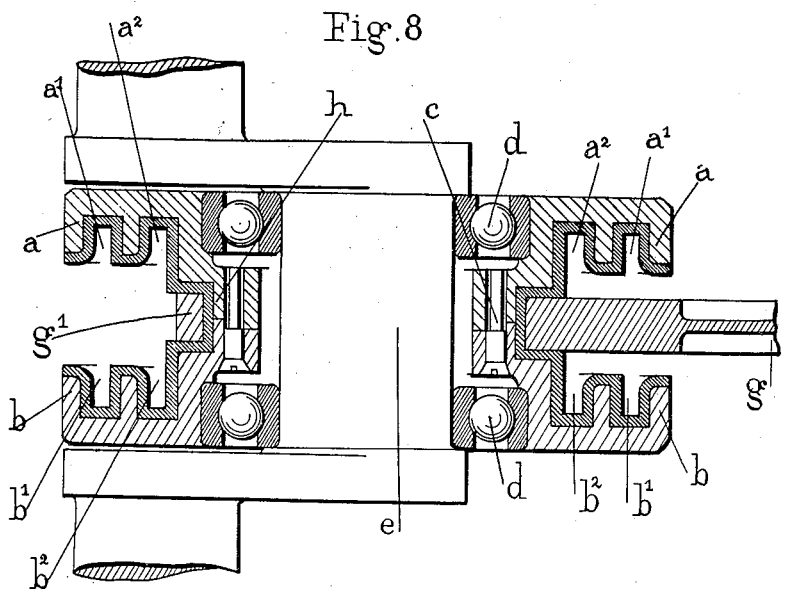

UNITED STATES PATENT OFFICE.

CLAUDE MULLET, OF LYON, FRANCE.

ARRANGEMENT FOR SECURING CONNECTING-RODS TO THE SINGLE CRANKS OF FIXED OR ROTARY RADIAL-CYLINDERED ENGINES.

1,287,398.  Specification of Letters Patent.  Patented Dec. 10, 1918.

Application filed September 28, 1917. Serial No. 193,758.

*To all whom it may concern:*

Be it known that I, CLAUDE MULLET, engineer, a citizen of the Republic of France, and a resident of 65 Place Guichard, Lyon, France, have invented new and useful Improvements in Arrangements for Securing Connecting-Rods to the Single Crank of Fixed or Rotary Radial-Cylindered Engines, of which the following is a specification.

This invention relates to an arrangement whereby a certain number of connecting rods can be together connected with the single crank-throw of a multi-cylinder engine having its cylinders arranged radially, and of the fixed or rotating variety, the connecting rods being all arranged in the same plane passing through the axes of the cylinders.

The big end of the connecting rod is formed of two plates assembled together by joints or clamps and rendered solid one with the other by screws or bolts, and can turn freely on smooth bearings or ball bearings. Upon the internal face of each of these plates, are formed concentric circular channels or grooves which are exactly opposite one another. Each connecting rod is composed essentially of an eye or small end for its joint with the axis of the piston, of a straight portion forming the body and of which the section can be as desired, and of an extremity in the shape of two stepped claw-like feet or extensions situated on each side of the plane passing through the axes of the cylinders, these claw-like feet being designed to slide in the corresponding concentric grooves of each of the plates of the big-end of the connecting rod.

Each connecting rod has its upper claw-like foot inserted in the outer groove of one of the plates and its lower claw-like foot in the inner groove of the other plate. Two adjacent connecting rods are arranged in the opposite manner so that the upper foot of any one of the connecting rod is, for instance, engaged in the outer groove of one of the plates while the upper foot of the following connecting rod is engaged in the outer groove of the other plate. The lower foot of each of these connecting rods, being respectively opposite to the upper feet, is engaged in the opposite (*i. e.* inverse) interior grooves to the preceding ones. The result of this is that when the number of connecting rods is even and otherwise of any number, all the connecting rods are identical but they are inversely placed one relatively to the other and two and two in the grooves of the plates.

Between each foot and on each side of the stem of the connecting rod, a passage of the width of this stem, exists to permit the necessary closing together to a minimum of the stem of two successive connecting rods and to permit them to assume the necessary inclination relatively to the axis of the cylinders.

The upper foot of any one connecting rod partially covers, on each side of the axis of the connecting rod, the lower foot of each of the two neighboring connecting rods.

When the connecting rods are of an uneven number, the only difference consists in the interposition, between only two consecutive connecting rods, of a special connecting rod of which the foot may, for instance, take the form of an annulus and be made either fast to the big end of the connecting rod by the fixation screws of the plates, or, on the contrary, free to slide around the hub formed by the assembly of the plates, in the same manner as the other connecting rods. This special connecting rod may take, of course, any one of a number of shapes not specified here and forming only variations of that above described.

The annexed drawings show a method of carrying out this mechanism in the two cases above considered.

Fig. 7 is a view of the interior face of one of the plates, in the case of a number of unequal connecting rods, nine in this case. The other plate is supposed removed.

Fig. 8 is a vertical section on line E E of Fig. 7, the special connecting rod with annulus being alone represented.

Referring to the construction shown in Figs. 1 to 6 inclusive, the plates $a$ and $b$ form the head or big end of the connecting rod and in each of which are formed the concentric grooves $a^1$ $a^2$ and $b^1$ and $b^2$ exactly opposite one another; screws $c$ render the two plates solid one with the other; ball bearings $d$ permit the whole formed of the two plates to turn freely around the crank-throw $e$.

Figure 3:
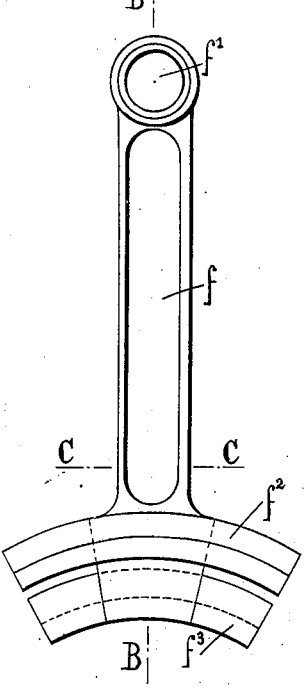
Fig. 3 is a front view of a connecting rod.
Figure 4:
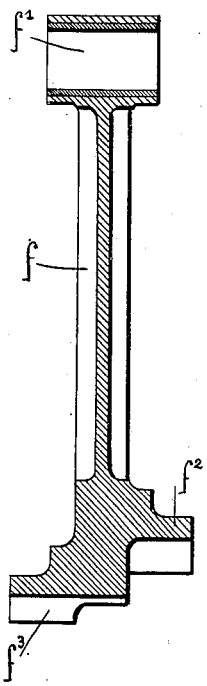
Fig. 4 is a vertical section on line B B of Fig. 3.
Figure 5:
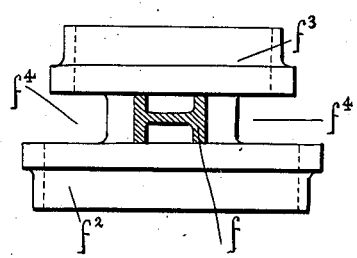
Fig. 5 is a horizontal section on line C C of Fig. 3.

Figs. 3, 4 and 5 show the details of construction of a connecting rod. $f$ is the stem, $f^1$ the small end to which is secured the piston, $f^2$ is the upper claw-like foot, and $f^3$ is the lower claw-like foot. Each foot is ribbed and the spaces $f^4$ between each of them are such as to allow the closing together to a minimum of the stems of the connecting rods (Fig. 5 and Fig. 6).

Figure 1:
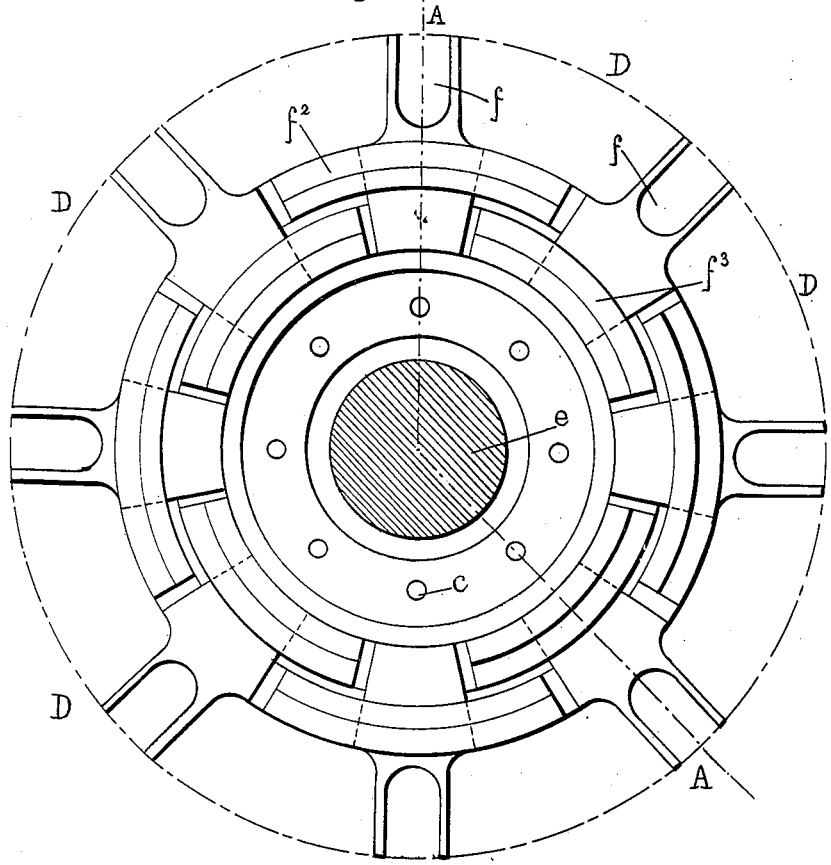
Figure 1 shows the interior front view of one of the plates, in the grooves of which are engaged the connecting rods of even number, viz., eight in this case. The other plate is supposed to be removed.
Figure 2:
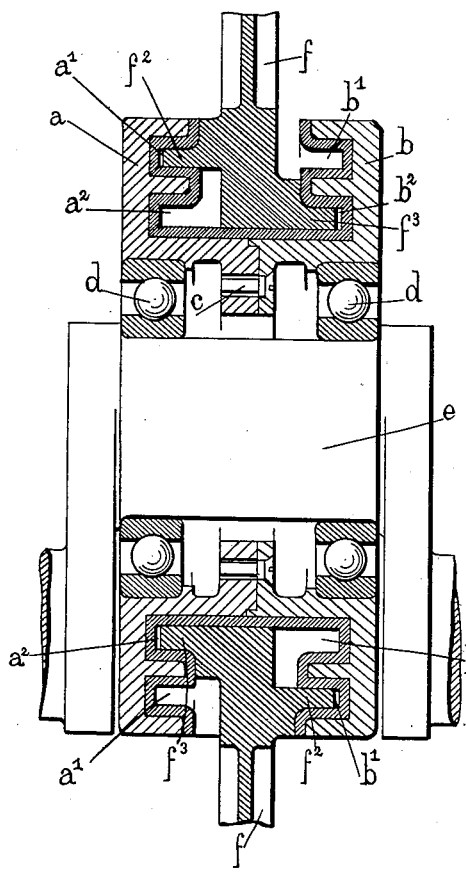
Fig. 2 is a vertical section, on line A—A of Fig. 1; two connecting rods are represented, one in the opposite arrangement or position to the other, as are two succeeding connecting rods.

In Fig. 1, eight identical connecting rods are symmetrically shown but arranged alternately in the opposite manner in the grooves of the plates, in the way shown in Fig. 2. Adjacent connecting rods have their feet $f^2$ $f^3$ placed in opposite ways in the corresponding grooves of each of the plates; the upper foot $f^2$ of one connecting rod $f$ being, for instance, engaged in the outer groove $b^1$ of the right-hand plate $b$, its lower foot $f^3$ is then engaged in the inner groove $a^2$ of the left-hand plate $a$. For the following connecting rod, the arrangement is the opposite: the upper foot $f^2$ is engaged in the outer groove $a^1$ of the left-hand plate $a$ and its lower foot $f^3$ is engaged in the inner groove $b^2$ of the right-hand plate $b$ and so on. The result is that in each of the outer grooves $a^1$ and $b^1$ of the plates, there is a set of four upper feet of the connecting rods and in each of the inner grooves $a^2$ and $b^2$, there is a set of four lower feet, the sets of feet seated in the grooves $a^1$ and $b^2$ belonging to the same set of four connecting rods, and those seated in the grooves $b^1$ and $a^2$ for the other set of four connecting rods and of which the feet are arranged inversely, to those of the preceding set. The supporting arch and the bearing surface of these claw-like feet is considerable, as can be seen, and sufficient to insure a good bearing and to avoid all untimely binding or seizing.

Figure 6:
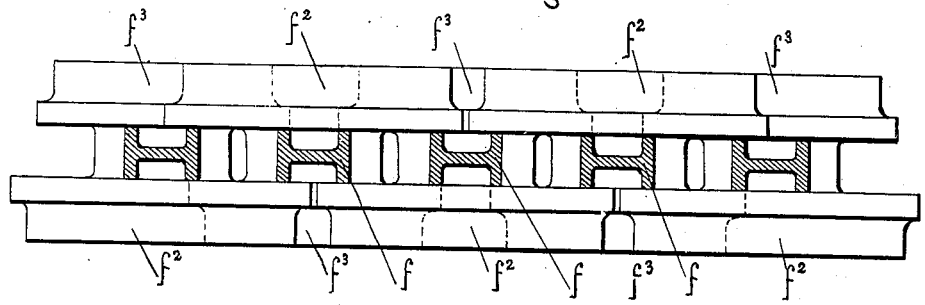
Fig. 6 is a development in plan on line D D D D, Fig. 1, of a series of claw-like feet of succeeding connecting rods in the position of minimum closing or bringing together.

The development of Fig. 6 shows how the feet of one series of connecting rods appear in the position in which they are closed together to a minimum. The lower feet are not visible in part and are shown in dotted lines.

In Figs. 7 and 8, representing the case of an uneven number of connecting rods (nine in the present example) the letters have the same signification as in the preceding figures. $a$ and $b$ are the plates forming the big end of the connecting rod, in which are formed the concentric grooves $a^1$ $a^2$ and $b^1$ $b^2$; the screws $c$ render the plates fast together. The ball bearings $d$ permit the assembled plates to turn freely around the crank pin $e$; eight connecting rods identical with those of the previous example have their feet oppositely arranged, two and two, in the grooves $a^1$ $b^2$ and $a^2$ $b^1$ of the plates $a$ and $b$, and can freely slide therein, in the same manner as in the previous instance. Lastly, a ninth connecting rod $g$ of which the extremity ends in an annulus $g^1$ can slide freely around the hub $h$ formed by the assembly of the two plates $a$ and $b$. Obviously, the shape of this special connecting rod is here given only by way of example and it may take various other shapes in construction and afford an analogous result.

In the following claims I use the expression "crank pin" in a sense broad enough to cover an eccentric or other equivalent element in either a rotary or a stationary cylinder engine; the expression "sleeve" is used in a sense broad enough to cover a plural element member such as $a$—$b$ or any other structure adapted to receive the heads of the piston rods; the term "piston-rod" is used in a sense broad enough to cover a connecting rod or link or the equivalent operative connection between the piston head and the crank pin. Furthermore it is obvious that various modifications in detail of construction may be made without departing from what I claim as my invention.

I claim:—

1. A crank-pin piston-rod connection comprising a sleeve rotatably mounted on the crank pin and having a pair of concentric bearing grooves, in combination with a series of piston rods having heads with radially-spaced oppositely extending arcuate claws engaging said grooves at spaced intervals in substantially the same transverse plane.

2. A crank-pin piston-rod connection comprising a sleeve rotatably mounted on the crank pin and having a pair of concentric bearing grooves, in combination with a series of piston rods having heads with radially-spaced, oppositely extending arcuate claws engaging said grooves at spaced intervals in substantiallly the same transverse plane, the juxtaposed claws of adjacent rods engaging in different bearing grooves.

3. A crank-pin piston-rod connection comprising a sleeve rotatably mounted on the crank pin and having a pair of concentric bearing grooves, in combination with a series of piston rods having heads with radially-spaced, oppositely extending arcuate claws engaging said grooves at spaced intervals in substantially the same transverse plane, the juxtaposed claws of adjacent rods engaging in different bearing grooves and overlapping each other.

4. A crank-pin piston-rod connection comprising a sleeve rotatably mounted on the crank pin and having a pair of concentric bearing grooves, in combination with a series of piston rods having heads with radially-spaced, arcuate claws engaging said grooves at spaced intervals in substantially the same transverse plane, together with a piston rod lying in the same plane and having a ring connection coaxial with the crank pin.

In testimony whereof I have signed my name to this specification.

CLAUDE MULLET.

Witnessed by:
 FRANCIS DEVAUX,
 CLAUDE JOSEPH BRUT.